No. 758,991. PATENTED MAY 3, 1904.
F. M. LUM.
PACKING BOX.
APPLICATION FILED DEC. 26, 1903.
NO MODEL.

No. 758,991. Patented May 3, 1904.

UNITED STATES PATENT OFFICE.

FRANKLIN M. LUM, OF WEST HAVEN, CONNECTICUT.

PACKING-BOX.

SPECIFICATION forming part of Letters Patent No. 758,991, dated May 3, 1904.

Application filed December 26, 1903. Serial No. 186,531. (No model.)

*To all whom it may concern:*

Be it known that I, FRANKLIN M. LUM, of West Haven, in the county of New Haven and State of Connecticut, have invented a new and useful Improvement in Packing-Boxes; and I do hereby declare the following, when taken in connection with the accompanying drawings and the letters of reference marked thereon, to be a full, clear, and exact description of the same, and which said drawings constitute part of this specification, and represent, in—

Figure 1:
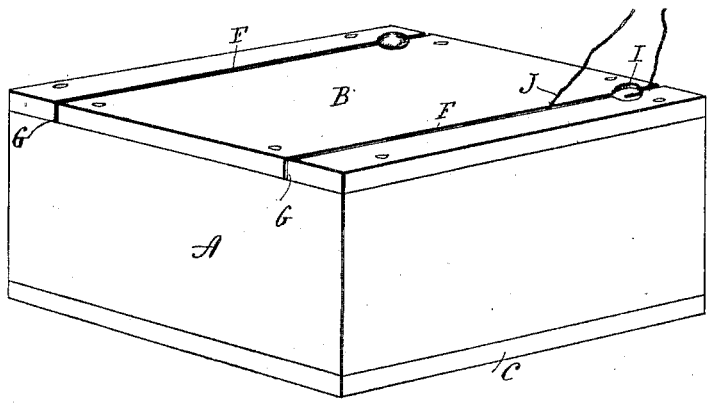
Figure 2:
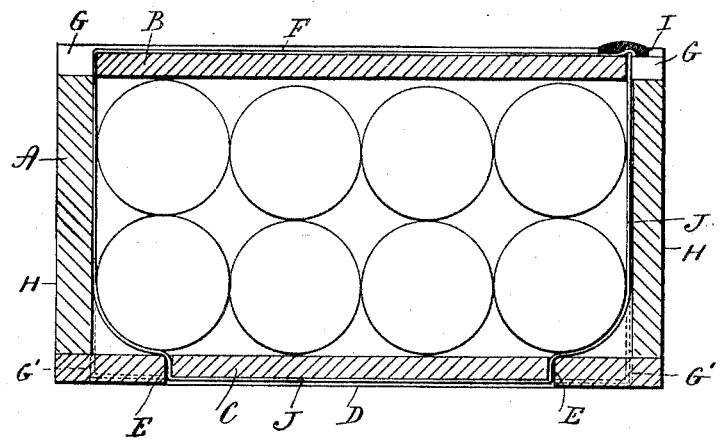

Figure 1, a perspective view of a box wired in accordance with my invention, the ends of one of the wires separated; Fig. 2, a transverse view through a box wired and sealed in accordance with my invention.

This invention relates to an improvement in packing-boxes, and particularly to means for sealing the same so that the contents cannot be removed or if removed will at once indicate such removal, the object of the invention being a simple construction applicable for packing-boxes of all sizes and for various purposes; and the invention consists in the construction as hereinafter described and particularly recited in the claim.

The box A may be of any desired form and size, having a cover B and bottom C. Preferably and as herein shown the outer face of the bottom is formed with one or more transverse grooves D and with holes E at the ends of said groove or grooves opening into the interior of the box. The cover B is formed with one or more transverse grooves F, corresponding in position to the position of the grooves in the bottom, and in the sides of the cover at the ends of the grooves are notches G, slightly greater in depth than the thickness of the sides H of the box. In the top B are recesses I, into which the grooves F open for the purpose as will hereinafter appear. In connection with a box and cover thus formed I employ a binder J, of wire cord or other suitable material, which rests in the groove D, the ends extending upward through the openings E in the bottom and thence upward through the notches G and into the grooves F, the ends of the binders being adapted to be twisted together and sealed in the recess I.

In the sectional view shown in Fig. 2 I have indicated the box as containing a number of bottles, the wires entering the box passing around the bottles or packages contained in the box, and this construction permits the wires to bind the contents of the box, and should one of the packages in the box be removed through the end of the box or in any other way without breaking the seal the wire exposed through the top or bottom of the box will become slack, so as to indicate at once that the box has been tampered with. The wire will be placed in the box, the ends overhanging the upper edge thereof, so that the box can be conveniently packed and the cover secured in the usual manner by nails or screws. After the cover is attached wires are drawn through the notches G and the ends twisted together and sealed, the recesses I forming a convenient point to seal the ends.

With the boxes wired and sealed as above described it is impossible to remove either the top or bottom without breaking the wires, and if the wires are broken it is impossible to replace them without removing the contents, thus making it very difficult to remove the contents from a box without having it apparent to the most casual observer. It is a well-known fact that many goods are lost during transportation owing to the ease with which boxes may be opened and the covers replaced without showing evidence thereof.

Having fully described my invention, what I claim as new, and desire to secure by Letters Patent, is—

As a new article of manufacture, the combination with a packing-box formed in its top and bottom with external grooves and in its top and bottom with passages leading from the ends of the said grooves into the packing-chamber of the box; of a binder located in the groove in the bottom of the box and extended through the passages leading from the ends of the said groove into the bottom of the said packing-chamber, and then up through the said chamber and into and through the passages leading out of the top of the box into the ends of the grooves therein, the said passages being located and arranged so that the binder will be deflected and displaced by the introduction of the articles packed in the packing-chamber of the box, whereby if the contents of the box are removed in whole or in part, slack will be produced in the binder when the ends thereof are sealed, and appear upon the outside of the box and show that it has been tampered with.

In testimony whereof I have signed this specification in the presence of two subscribing witnesses.

FRANKLIN M. LUM.

Witnesses:
  HENRY C. THOMAS,
  FREDERICK W. HOPPER.